United States Patent [19]

Thiebaut et al.

[11] Patent Number: 5,132,961
[45] Date of Patent: Jul. 21, 1992

[54] METHOD AND DEVICE FOR EVALUATING THE THROUGHPUT OF VIRTUAL CIRCUITS EMPLOYING AN ASYNCHRONOUS TIME-DIVISION MULTIPLEXED TRANSMISSION CHANNEL

[75] Inventors: Georges Thiebaut, Perros Guirec; Denis Le Bihan, Lanmerin, both of France

[73] Assignee: Alcatel Cit, Paris, France

[21] Appl. No.: 540,715

[22] Filed: Jun. 20, 1990

[30] Foreign Application Priority Data

Jun. 20, 1989 [FR] France .................. 89 08193

[51] Int. Cl.$^5$ .................. H04J 1/16; H04J 3/14; H04J 3/24
[52] U.S. Cl. .................. 370/13; 370/94.1
[58] Field of Search .................. 370/94.1, 60, 84, 17, 370/110.1, 13, 60.1, 94.2; 379/133, 134

[56] References Cited

U.S. PATENT DOCUMENTS

| | | | |
|---|---|---|---|
| 4,484,326 | 11/1984 | Turner | 370/94.1 |
| 4,763,319 | 8/1988 | Rozenblit | 370/84 |
| 4,769,810 | 9/1988 | Eckberg, Jr. et al. | 370/94.1 |
| 4,779,267 | 10/1988 | Limb | 370/94.1 |
| 4,799,211 | 1/1989 | Felker et al. | 370/17 |
| 4,896,316 | 1/1990 | Lespognol et al. | 370/94.1 |
| 4,905,231 | 2/1990 | Leung et al. | 370/94.1 |

FOREIGN PATENT DOCUMENTS 0241113 10/1987 European Pat. Off. .
0275679 7/1988 European Pat. Off. .
0293314 11/1988 European Pat. Off. .

OTHER PUBLICATIONS

French Search Report, Mar. 29, 1990, by Examiner De La Fuente Agua P.

Primary Examiner—Douglas W. Olms
Assistant Examiner—H. Kizou
Attorney, Agent, or Firm—Sughrue, Mion, Zinn, Macpeak & Seas

[57] ABSTRACT

A memory location is assigned to each virtual circuit, this location containing a context (CT) that defines the evaluation conditions for measuring the throughput of the virtual circuit and then, upon reception of each cell, providing for the context relating to the virtual circuit to which the cell belongs to be read. A clock signal is adapted to supply a current time associated with this virtual circuit, and throughput measurement circuits supply, at the arrival of a cell, a virtual circuit throughput measurement for this virtual circuit. The context (CT) includes at least one throughput threshold, and provision is made to compare such a throughput measurement therewith in order to drive an excess rate counter in a first direction if this threshold is reached or exceeded or in another direction if the threshold is not reached, it being determined if such driving has brought the excess throughput counter to an end position in the first direction in order to then supply a signal (OSC) indicating the need for corrective action.

4 Claims, 4 Drawing Sheets

METHOD AND DEVICE FOR EVALUATING THE THROUGHPUT OF VIRTUAL CIRCUITS EMPLOYING AN ASYNCHRONOUS TIME-DIVISION MULTIPLEXED TRANSMISSION CHANNEL

BACKGROUND OF THE INVENTION

The present invention relates to a method and a device for evaluating the throughput of virtual circuits employing an asynchronous time-division multiplexed transmission channel.

An asynchronous time-division multiplexed transmission channel is a transmission channel carrying data messages within digital data structures referred to as cells. Each cell consists of a header made up, for example, by four characters of eight bits and a message body containing a defined number of characters, 32 for example. On the transmission channel, such cells follow each other without interruption. If there is no message to be transmitted, the transmission channel carries an "empty" cell, in other words a cell having the same format as a message cell and carrying conventional information that is readily recognizable. Steps are taken for maintaining a sufficient proportion of such empty cells in the message cell stream; they have the purpose, notably, of synchronizing the receive end to the cell format.

The header of each message cell contains, coded on two characters for example, an item of information that defines, for use by the receive end, the direction in which the message body should be retransmitted. The two other characters of the header contain service information and, notably, code checking and error detecting information relating to the two above characters relating to the destination of the cell. The same information is again encountered in the headers of irregularly spaced cells having the same destination. It thus identifies a sort of virtual circuit occupying part of the transmission capacity of the transmission channel. More generally, this virtual circuit will occupy the transmission channel and will introduce a certain throughput or traffic load thereinto, measured, for example, in cells by unit of time, and this throughput is subject to fluctuation. The invention has precisely the object of evaluating this throughput.

At any given time, the transmission channel is supporting several virtual circuits the cells of which interfit in irregular fashion into what is commonly called an asynchronous time-division multiplex. The fluctuating throughputs of the various virtual circuits are different. The sum of the throughputs is limited by the maximum throughput of the transmission channel, and this also fluctuates. This leaves space for the transmission of empty cells.

Moreover, the number of virtual circuits which can be separately identified depends on the number of bits allocated to this information in the cell header. The maximum number of virtual circuits is determined for its part, among other things, by the number of virtual circuits obtained by dividing the maximum throughput of the transmission channel by the minimum throughput of a data source able to employ a virtual circuit. This is very high and for example reaches 64 K.

But asynchronous time-division multiplex transmission is intended for the widest areas of application and the bit rates to be catered for from sources able to use a virtual circuit vary over an enormous range of rates (for example from several kilobits to several hundred of megabits per second). The number of virtual circuits that are active will hence in general be less than their maximum number.

An asynchronous time-division multiplexed transmission channel is hence designed for carrying data supplied by sources having varied and fluctuating bit rates. Further along the path to their destinations, switching and transmission equipment route the messages contained in the cells to their destination. A check is hence required, at the level of the transmission channel considered for avoiding the danger of congestion further down the line, that no source, as a result of faulty operation or improper use, is introducing a throughput that is greater than the overall throughput assigned to the circuit. If this does happen, the currently employed corrective action consists in preventing the transmission channel from carrying any cell that is considered as in excess with respect to the throughput globally assigned to the virtual circuit, or at least in marking the excess cell as such, so that it will be rejected further down the line should congestion exist. The present invention relates to a system for evaluating the throughput of virtual circuits which enables such verification to be carried out and excess cells to be thus signaled.

Such evaluation amounts to measuring the throughput of each virtual circuit, evaluating the measured throughput with respect to determined limits and, when certain limits are exceeded, determining the necessity for corrective action that can take one of the forms indicated above.

Throughput measurement can be done by providing one memory per virtual circuit and a clock signal that supplies a current timestamp. Upon receiving a cell from the virtual circuit, the current time is written into the memory. The memory is read upon reception of the next cell for the same virtual circuit. We now have available both the time at which the previous cell was received and the current time which is the time of reception of the current cell. Knowing the relative ranks of these two cells, it is then possible to establish a throughput measurement that is attached to the present cell. For example, if the two cells considered are consecutive, the difference between the current time and the stored timestamp can give a measurement of instantaneous throughput of the virtual circuit. Other methods can be envisaged for obtaining such a throughput measurement.

After that, it is necessary to pass from a measurement of throughput to a measured throughput.

The throughput of a virtual circuit, in present-day applications, isn't designed to be constant. A virtual circuit can hence be authorized to, and will carry, a mean throughput over an extended period, a higher throughput over a short period, an even higher throughput over an even shorter period, and so on. Throughput measurement that is attached to a cell should thus be considered as a "one-off" value that needs interpreting, taking account of other prior throughput measurements, in order to lead to a measured throughput that can be compared at least with one threshold and to bring to light situations, and to determine the need for corrective action, where this threshold is crossed.

The present invention hence has the aim of providing a method and a device for evaluating the throughput of virtual circuits meeting such requirements.

SUMMARY OF THE INVENTION

The method for evaluating the throughput of virtual circuits carrying cells and employing an asynchronous timedivision multiplexed transmission channel in accordance with the invention comprises the use of a memory in which, for each virtual circuit, a memory location is assigned containing a set of data—referred to hereinafter as the context—defining the conditions of evaluation of the throughput of this virtual circuit and provides for, upon reception of each cell, reading of the context of the virtual circuit to which said cell belongs, with a view to evaluating the throughput of this virtual circuit, the method further comprising the use of a clock signal adapted to supply a current time associated with this virtual circuit, as well as throughput measuring means that come into effect upon arrival of each cell in the throughput measurement of the virtual circuit to which said cell belongs, said measurement means supplying, upon the arrival of a cell, through the use of said current time and at least one starting time written into said context upon arrival of a preceding cell, at least one throughput measurement for the virtual circuit of this latter cell; it is characterized in that the context includes at least one throughput threshold and that provision is made for comparing said throughput measurement with this threshold and for starting an overflow counter, in a first sense, if this threshold is reached or exceeded, or in another sense if this threshold is not reached, as well as for determining that said starting has brought the overflow counter to an extreme position of said first sense, and for then supplying a signal indicating the need for corrective action.

According to another characteristic of the invention, several throughput thresholds are provided and a count value and provision is made to compare one of said throughput measurements with these thresholds in order to determine within which interval between thresholds said measurement lies, and for modifying said count value as a function of said determined interval, and further for determining the arrival at an extreme position in a first sense of this count value in order to then supply said signal indicating the need for corrective action.

The device for evaluating the throughput of virtual circuits carrying cells and employing an asynchronous time-division multiplexed transmission channel includes a memory in which, for each virtual circuit, a memory location is assigned containing a set of data, referred to hereinafter as the context, defining the conditions of evaluation of the throughput of this virtual circuit means providing, upon reception of each cell, reading of the context of the virtual circuit to which said cell belongs, for the purpose of evaluating the throughput of this virtual circuit, a clock signal adapted to supply a current time associated with this virtual circuit, as well as throughput measuring means that come into effect upon arrival of each cell in the throughput measurement of the virtual circuit to which said cell belongs, said measurement means supplying, upon the arrival of a cell, through the use of said current time and at least one starting time written into said context upon arrival of a preceding cell, at least one throughput measurement for the virtual circuit of this latter cell; it is characterized in that said context includes at least one throughput threshold and that means are provided for comparing one of said throughput measurements with this threshold and means for starting an overflow counter, in a first sense, if this threshold is reached or exceeded, or in another sense if this threshold is not reached, as well as means for determining that said starting has brought the overflow counter to an extreme position of said first sense, and for then supplying a signal indicating the need for corrective action.

According to a further characteristic of the invention, several throughput thresholds are provided and a count value and provision is made to compare one of said throughput measurements with these thresholds in order to determine within which interval between thresholds said measurement lies, and for modifying said count value as a function of said determined interval, and further for determining the arrival at an extreme position in a first sense of this count value in order to then supply said signal indicating the need for corrective action.

The various objects and characteristics of the invention will be described in detailed in the description which follows, provided by way on non-limiting example and with reference to the attached drawings in which:

FIG. 1 is a block diagram of one embodiment of the invention;

FIGS. 2A and 2B together constitute a block diagram of the processing block BT of the system in FIG. 1;

DETAILED DESCRIPTION OF THE INVENTION

Figure 1:
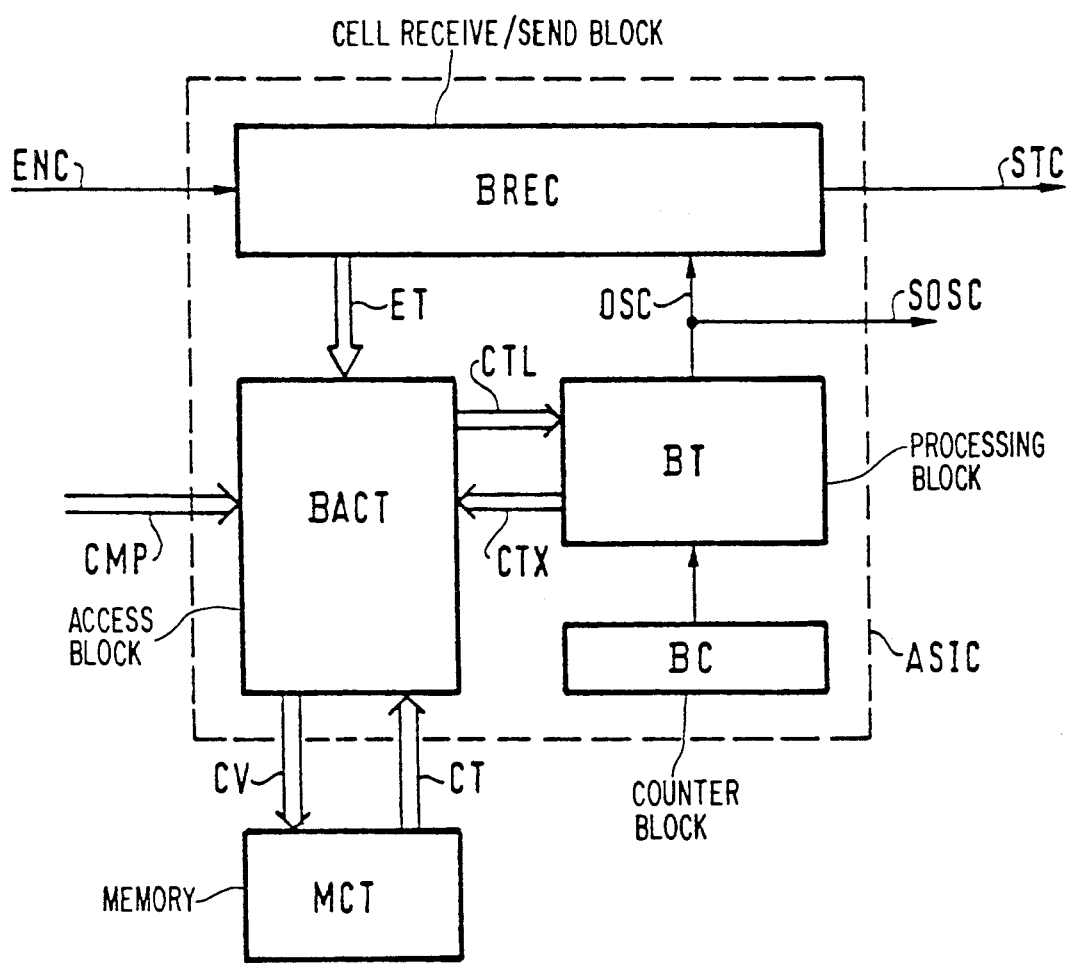

Reference will first be made to FIG. 1 which is a general diagram of one embodiment of the present invention.

The throughput evaluating system in FIG. 1 is interposed between a cell inlet ENC and a cell outlet STC. It is inserted into an asynchronous time-division multiplex transmission channel. To give a better idea, the bit rate of the transmission channel, as received at the inlet ENC, is for example 600 Mbit/s. This data stream passes through a cell receive/send block BREC which can be seen to be a shift register. Provided that the throughputs or bit rates of the virtual circuits supported by the link are acceptable, every cell that is received at the inlet ENC is purely and simply retransmitted onto the outlet STC with a delay which is equal, for example, to the cell transmission time, in other words some 0.5 $\mu s$.

A cell in accordance with the example mentioned in the preamble to the description consists of four header characters; two of these supply a 16-bit virtual circuit number. The cell also includes a message body consisting of 32 characters.

As soon as the header of a cell is available in block BREC, this header, ET, is supplied to an access block to the processing context BACT. Within this block BACT, the virtual circuit number, CV is used as the address for reading the processing context CT of the virtual circuit to which the cell that was received belongs, in a processing context memory MCT. This processing context CT is a set of digital information some of which is semi-permanent, in other words fixed for the duration of a call carried on the virtual circuit whereas others are modifiable, in other words subject to change upon reception of each virtual circuit cell. This processing context thus contains information which defines the "past history" of the virtual circuit.

The access block BACT supplies the processing context as read, and now called CTL, to the processing block BT which additionally is provided with timestamp information supplied by a counter block BC. On the basis of these two items of information, the processing block BT draws up a processing context, updates CTX which is returned to the access block BACT in order to be re-written at the same address CV, and supplies a signal OSC should the cell received not be acceptable.

The updated context CTX contains modifiable information which may possibly have changed by virtue of the processing program of block BT as a function of the fact that a cell has been received and, above all, as a function of the time the cell arrived which is indicated by the counter block BC.

The signal OSC is transmitted to the block BREC where, in a first embodiment, it produces the effect of replacing the cell received by an empty cell. In a second embodiment, the signal OSC only brings about marking of a flag provided in the cell header; its meaning, in the switching entities through which the cell will subsequently pass, will be that retransmission of the cell is not allowed in the case of overload. Other uses of the signal OSC can be imagined, these being implemented using an output SOSC for the signal OSC.

The time taken by the blocks BACT and BT to carry out the operations that have just been described is advantageously equal to the time taken to transmit one cell, whereby these blocks are subsequently available for a fresh operating cycle as soon as the following cell is received. One could nevertheless, as is well known in the art, arrange for the two blocks to operate such that the context read-processing-rewriting operations on a given received cell overlap with the same operations relating to the cell that follows it, in order for the access block BACT and the processing block BT to each have the whole duration of a cell available for operations relating to this cell.

The context data CT is initially written into the memory MCT by a command processor, which is not shown, that communicates with the access block BACT by a link CMP. On each occasion, the processor supplies a virtual circuit address CV and an item of context information CT. It can be envisaged that the block BACT be, for example, provided with means for identifying empty cells and for it to procede with writing a new context in the time taken to receive each empty cell.

The block BACT will, finally, contain operation monitoring devices and the processor, using link CMP, will read the operating reports contained therein.

Blocks BREC, BACT, BT and BC have been shown enclosed in a box of dashed lines because, for reasons that will become clear later, they can be implemented collectively in the form of an application-specific integrated circuit (ASIC).

Below, we shall provide no further detailed description of the send/receive block BREC which can, essentially, be a shift register, nor of the counter block BC which is generally a simple binary counter incremented by one step at each clock period of an internal clock and passing cyclically through all its positions. The number of stages in this counter will however be discussed later. Detail of the access block BACT will also not be provided since its functions have been clearly defined and its implementation, which is linked to the technology employed for memory MCT, is available to those skilled in the art. The detailed description which follows hence only concerns the processing block BT.

Figure 2A:
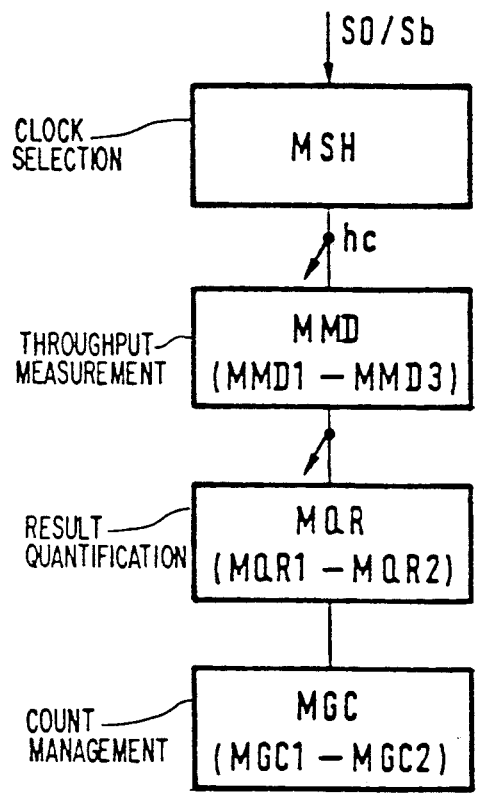
Figure 2B:
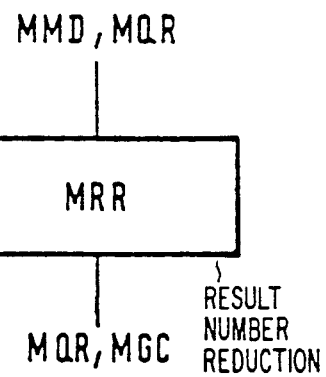

This processing block BT is illustrated in its broad outlines in FIG. 2. It comprises processing modules of six types: at least one clock selection module MSH, at least one throughput measuring module MMD, at least one result quantification module MQR, at least one result number reduction module MRR, at least one count management module MGC and at least one decision module MSC.

Figure 3:
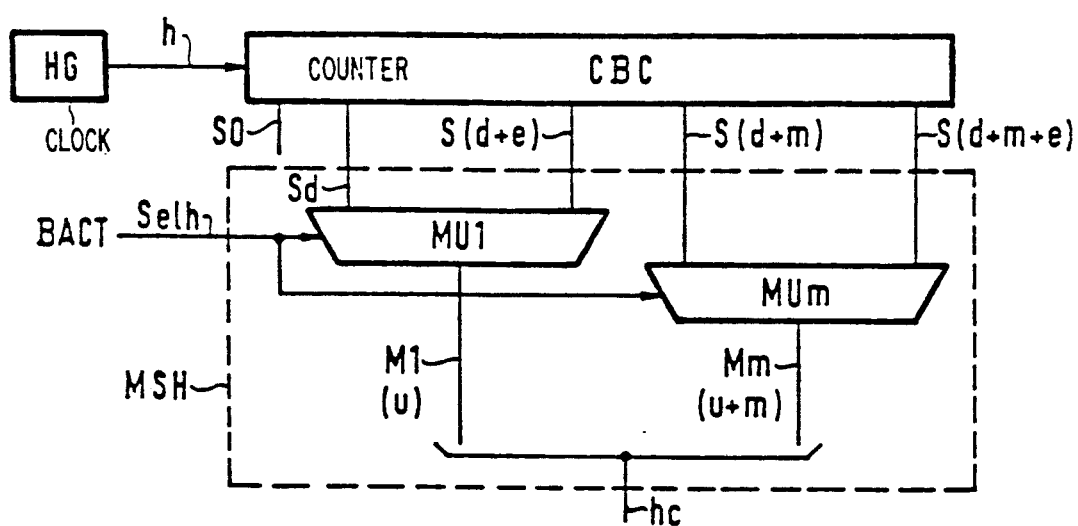
FIG. 3 shows one embodiment of the clock selection module MSH of FIG. 2.

A clock selection module MSH is shown in FIG. 3 which also illustrates the counter CBC of block BC, made up by a succession of binary stages commanded by a clock HG supplying pulses h. The outputs S0 to $S(d+m+e)$ of counter CBC are coupled to the clock selection module which additionally receives, from the context CT supplied by the access block BACT, a clock selection indication selh which is a binary indication able to adopt $e+1$ successive values. This indication is applied to m multiplexers MU1 to MUm which consequently all adopt the same orientation. Each one of these multiplexers is connected to a set of $e+1$ outputs of counter CBC, the m sets being themselves shifted on each occasion by one or several outputs, ranging from multiplexer MU1 up to multiplexer MUm. Multiplexer MU1 is thus connected to the outputs Sd to $S(d+e)$ of counter CBC, while multiplexer MUm is connected to its outputs $S(d+m)$ through $Db=S(d+m+e)$. Finally, outputs M1 to Mm of the m multiplexers supply a present or current time hc in the form of a binary number the significant bits of which vary from u to $u+m$, the significant bit u depending on the value of indication selh. Each virtual circuit is thus able to see itself provided with a clock signal that is appropriate to its throughput or bit rate, defined by the indication selh of its processing context.

It should nevertheless be noted that several clock selection blocks similar to the one that has just been described could be provided together. It will be seen later on that the throughput measuring modules all use a current time which is supplied by a clock selection module. One clock selection module such as the one shown in FIG. 2 is sufficient when a same current time is able to be used for all the measuring modules. It will be readily understood that, in some circumstances, it could be necessary to supply different current times to the various measuring modules; these times would then be supplied by an equivalent number of clock selection modules.

The processing block BT further comprises one or several throughput measuring modules MMD1 to MMD3.

Figure 4:
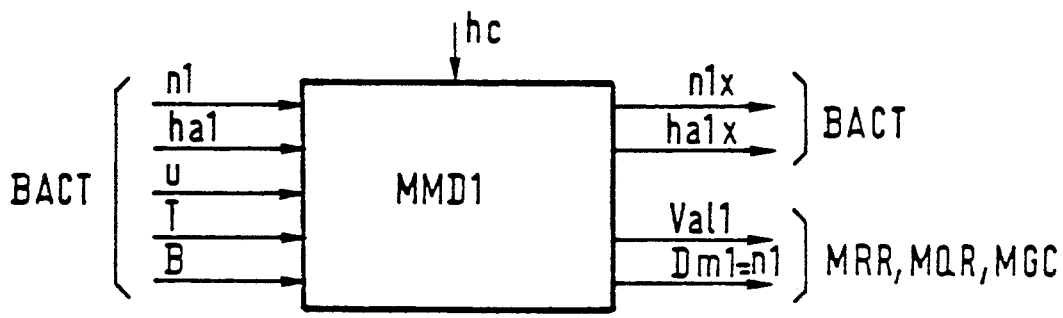
FIG. 4 shows a first embodiment of the throughput measuring module MMD of FIG. 2.

Module MMD1 will first be described with reference to FIG. 4. This module receives from context CT as supplied by block BACT, the following information:
- the duration T of a measurement time interval also referred to as T, expressed in periods u,
- the value of a period u,
- a measuring time interval start time ha1 that is subsequently established on the basis of the current time hc,
the number n1 of cells already received in the current time interval T,
- the number B of bits in a cell.

It also receives the current time hc supplied by the module MSH.

Module MMD1 calculates the difference hc−ha1. If this difference is less than T, it only supplies block BACT with a value $n1x = n1 + 1$, intended to take the place of the value n1 in the context CT. If, on the other hand, this difference is equal to or greater than T, it supplies an enabling signal Val1, accompanying a value $Dm1 = n1$, to the module that follows it, MQR, MRR or MGC. It then supplies block BACT with a value $n1x = 1$ and a value $ha1x = hc$ and these are recorded in the context CT as replacements of the values n1 and ha1. Thus, the start time recorded in the processing context CT is the time of reception of an earlier cell for which the value n1 was equal to 1.

The throughput Dm1 thus established at the expiration of each measurement interval of duration at least equal to T should strictly speaking have the value $n1*B/T*u$, equal to the number of bits received per second, if the period u is expressed in seconds. Nevertheless, as has been indicated, $Dm1 = n1$ and the measurement result does not contain the factor $B/T*u$. It is hence not necessary for the module MMD1 to receive from processing context CT, the values u and B which are only used for establishing the result. It will be seen below that these factors that are absent from the measuring result are in fact taken into account in the block which makes use of this result. Moreover, it can be noted that the value B can be a constant of the transmission system and that the value T can be a constant of the evaluation system. In this case, they are not supplied by the context CT, but are included in the form of constant values in the modules of processing block BT.

It should finally be mentioned that measurement of the measuring time interval T, although not carried out rigorously, can be sufficiently accurate. In effect, this period of time starts, as indicated, by the time of arrival of a cell and the number of cells already received, set to 1. Following this, the cells are counted until one cell is received for which the difference hc−ha1 indicates that the measurement time interval has been timed out. This latter cell does not make up part of the throughput indication since the end of the measurement time interval has been reached. It will however make up part of the count of the next measurement interval. Hence, all cells are counted. A lack of accuracy originates from the fact that the measurement time intervals are not strictly adjacent. The inaccuracy is at the most equal to one unit in the number of cells counted per measurement time interval. With a sufficiently high number of cells, at the expected average throughput, this lack of accuracy can be negligible.

Thus, the throughput measurement carried out by module MMD1 is hence supplied by a number of cells already received in the measurement time interval, prior to the arrival of the cell under consideration.

Figure 5:
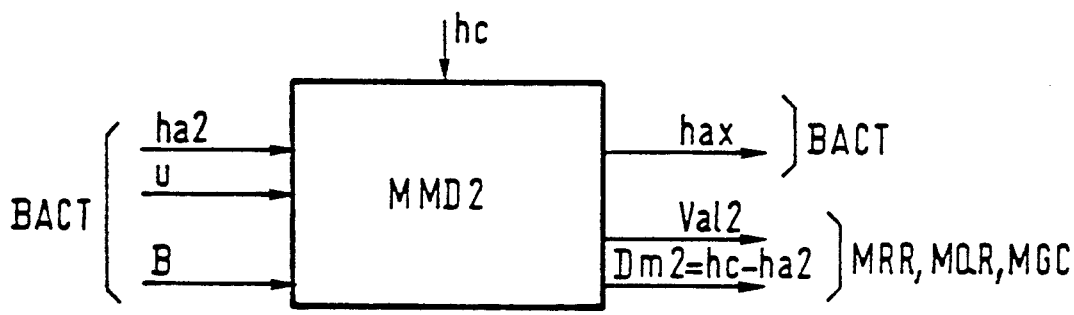
FIG. 5 shows a second embodiment of the throughput measuring module MMD of FIG. 2.

Module MMD2 in FIG. 5 receives, apart from the current time hc originating from clock selection block MSH, the value B as defined above and a value ha2 which now is the current time ascertained when the previous cell was received, these two latter values originating from the processing context CT supplied by block BACT.

Module MMD2 thus establishes, for each cell that arrives, the difference between hc and ha2. It supplies an enabling signal Val2, accompanying a value $Dm2 = hc - ha2$, ready for the next module MQR, MRR or MGC. It also supplies block BACT with a value $ha2x = hc$ which is entered into the context CT as a replacement for value ha2.

The expression for the throughput thus established at reception of each cell should rigorously have a value equal to $B/(hc - ha2)*u$, but the factors B and u are not included in the measurement result Dm3; they are taken account of in the next module as will be seen below. Also, value B, as indicated above, can be a constant of the transmission system.

In the case of this module MMD2, throughput measurement is thus directly supplied by the duration of the time interval that has elapsed between the cell which has just arrived and the preceding cell of the virtual circuit under consideration.

Figure 6:
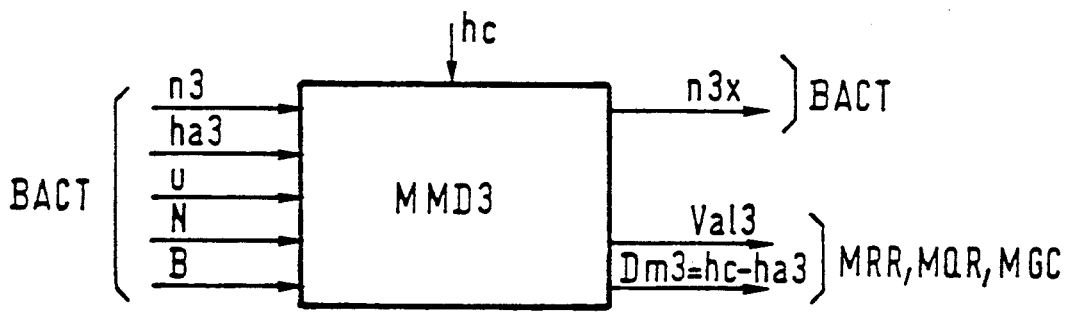
FIG. 6 shows a third embodiment of the throughput measuring module MMD of FIG. 2.

Module MMD3 shown in FIG. 6 receives, apart from the current time hc originating from clock selection block MSH, the previously defined value B, a value ha3 which now is the current time recorded when a first cell of a set of N cells was received, a count n3 which is the number of cells already received of this set of N cells, as well as a value N which the count of the cells in a set should reach, these various values originating from the processing context CT.

Module MMD3 first carries out incrementation of the count n3, $n3x = n3 + 1$, and then compares the count n3x with the value N. If $n3x < N$, module MMD3 supplies the count n3x to block BACT for updating the processing context CT (the value ha3 remains unchanged). If $n3x = N$, block MMD3 calculates the difference hc−ha3. It supplies an enabling signal Val3, accompanied by a value $Dm3 = hc - ha3$, for use by the next module of the MMR, MQR or MGC type. It also supplies block BACT with a value $ha3x = hc$ and a value $n3x = 0$ which are recorded in the context CT as replacements for the values ha3 and n3.

The rigorous expression for throughput established in this way upon reception of each cell is as follows:

$$B*N/(hc - ha3)*u,$$

but the factors B, N and u are not included in the measurement result Dm3; they are taken account of in the next module. Also, the value B, as indicated above, can be a constant of the transmission system. As regards the value N, this can be a constant of the evaluation system.

The throughput measurement supplied by module MMD3 is now the duration of the time interval required for receiving N cells. It can also be considered as the average time interval between consecutive cells, evaluated over N cells, multiplied by a constant, which also is N.

Figure 7:
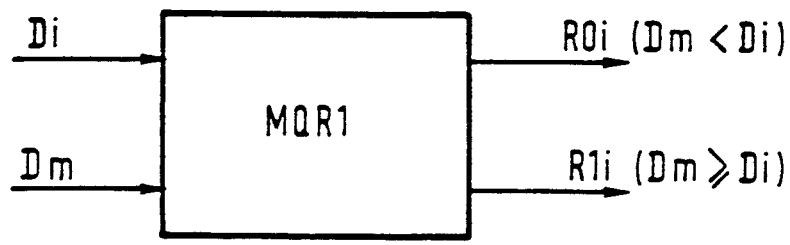
FIG. 7 shows a first embodiment of the result quantification model MQR of FIG. 2.

The processing block BT further includes in accordance with the invention, at least one result quantification module MQR. This can take the form of module MQR1 illustrated in FIG. 7. This module MQR1 receives an indication of the measured throughput measurement Dm, in other words one of the measurement results Dm1, Dm2, Dm3, originating from one of the preceding modules MMD1 to MMD3, and receives a throughput threshold indication Di originating from the processing context CT. It compares one of these with the other and produces a result signal ROi if the measured throughput value does not reach the threshold value, or a result signal R1i if the measured throughput value is equal to or greater than the threshold. These signals are available either to a subsequent module MRR or go directly to one of the count management modules MGC.

Figure 8:
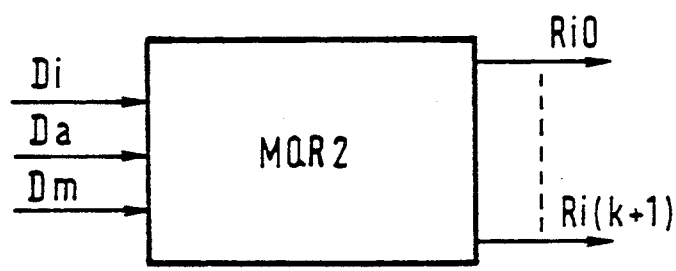
FIG. 8 shows a second embodiment of the result quantification module MQR of FIG. 2.

As an alternative embodiment, the result quantification module MQR can take the form of module MQR2 illustrated in FIG. 8. Apart from the values Di and Dm, module MQR2 also receives, from context CT, a value Da. In module MQR, the values Di and Da are combined in order to supply a threshold indication scale Di, Di+Da, Di+2*Da..., Di+k*Da and the value Dm is compared with this set of threshold values whereby the module produces a result signal Ri0 only if the lowest threshold value is not reached, signal R1i if threshold Di is exceeded, but none of the thresholds following it, and so on, result signal R(k+1)i being supplied only when the highest threshold value Di +K*Da is exceeded. These signals are available either to modules for reducing the number of results MRR or directly to the count management modules MGC.

In the module MQR2, as an alternative embodiment, it is still possible for the various values of the threshold indication scale to be directly supplied by the context.

Figure 9:
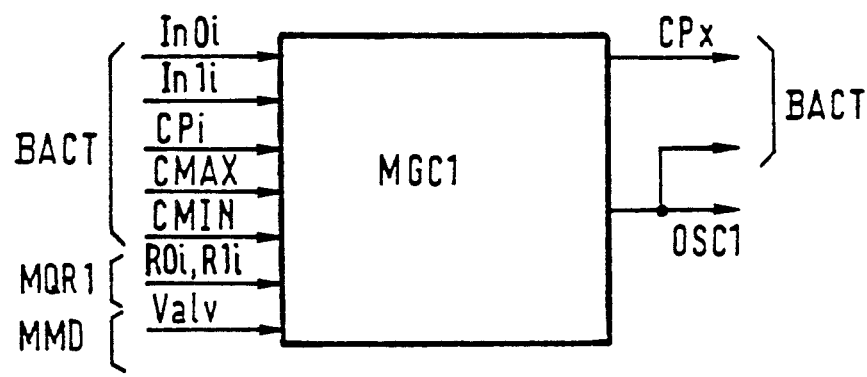
FIG. 9 shows a first embodiment of the count management module MGC of FIG. 2.

We shall now describe an embodiment of a count management module MCG1, illustrated in FIG. 9.

This module follows a MQR1-type result quantification module From the latter it receives, upon reception of a cell, a result indication R0i, R1i at the same time as a validation signal valv which is in fact the same thing as the validation signal of the module that supplied the measurement result that is at the origin of the result indication. At the same time, module MCG1 receives from the context an overflow counter indication CPi, a minimum threshold indication CMIN, a maximum threshold indication CMAX, as well as a negative increment In0i and a positive increment In1i.

In exchange, module MCG1 modifies the value of overflow counter CPi, either by subtracting therefrom the negative increment (In0i), if the result indication R0i is present, or by adding thereto the positive increment In1i if result indication R1i is present. This produces a new value for the CPx threshold overflow counter which is compared with the thresholds CMIN and CMAX. If CPx < CMIN, then CPx is limited to the value CMIN. No other action is taken. We can consider this as tantamount to the virtual circuit receiving a credit limited by the value CMIN to be kept ready for subsequent exceeding of the throughput threshold. If CPx is comprised between the two thresholds, the value CPx is recorded as such. The received cell is accepted. If CPx > CMAX this means that the measured throughput is greater than the permitted throughput, all credit having been consumed. CPx is limited to CMAX and instruction OSC1 is issued in order to bring about corrective action.

Thus, at each throughput measurement, the result of measurement is compared with a threshold in module MQR1. Exceeding of the threshold is counted in the throughput of the threshold overflow counter CPi, a measurement that is less than this threshold giving rise to a credit. Persistent exceeding of the threshold leads to corrective action.

It will be noticed that the positive and negative increments can be constants of the device and, for example all equal to unity. In this case, they are not supplied by the context but hardwired in module MCG1. The same can also apply to the thresholds CMIN and CMAX.

Figure 10:
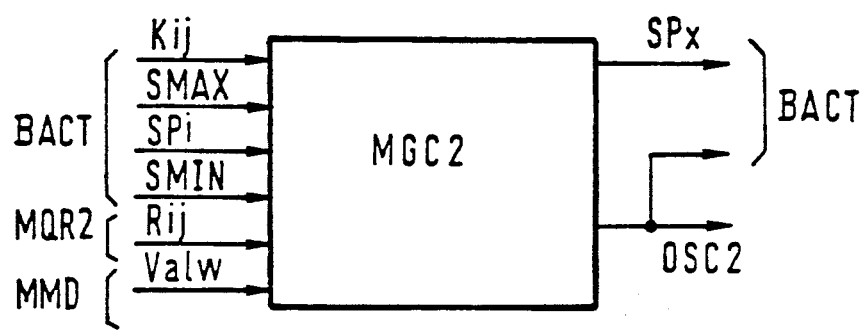
FIG. 10 shows a second embodiment of the count management module MGC of FIG. 2.

We shall now describe a second example of an embodiment of a count management module according to the invention which is designated by the reference MGC2 and illustrated in FIG. 10. This module should be preceded by a result quantification module such as module MQR2 illustrated in FIG. 8. It will be recalled that at each cell, module MQR2 supplies, for different threshold values, an indication Rij (i=threshold value scale; j=0..., (k+1)) characterizing the exceeding of the threshold, in other words the fact that the measurement value is located in the interval between a threshold j and the next threshold j+1. The item of information Rij corresponding to one of these thresholds is supplied to the count management module MGC2, accompanied by an enabling signal valw, which in fact is the enabling signal supplied by the measurement module from which the quantified measurement result originated, at the same time as a count value SPi established upon reception of a preceding cell as will be seen below, a maximum counting threshold value SMAX, a minimum counting threshold value SMIN, as well as a counting scale Kij.

The counting scale Kij is a set of counting values and each value Rij corresponds to one of these values. Depending on the item of information Rij, one of the counting scale values Kij is activated and this value (which can be positive or negative) is added to the count value SPi. Following this, the modified value SPx is compared to the maximum threshold SMAX. If SPx > SMAX, instruction OSC2, similar to instruction OSC1 (see above) is issued. In parallel with this, the modified value SPx is compared to the minimum threshold SMIN. If SPx < SMIN, the value SPx is limited to SPx = SMIN. No other action is carried out.

Hence, the count value SPi evolves in response to each measurement result and depending on the position of the result with respect to a scale of threshold values, as specified by the counting scale. It is thus for example possible to grant credits on a degressive scale to small throughputs and progressive penalties to high throughputs.

The same indication Rij supplied by a result quantification module can be communicated to several count management modules MGC2, having differing counting scales. This makes it possible to evaluate several virtual circuit throughputs in parallel using differing criteria.

The counting scale Kij can be a constant of the evaluation system and in this case, it is not supplied by the context but rather written in the module MGC2. In accordance with one variant, several separate counting scales are written into the module MGC2; the item of information Kij designates one of these scales, and is used, in module MGC2, for selecting and implementing this scale.

Appearance of an OSC1 or OSC2 instruction will further advantageously have the effect of partially inhibiting updating of the processing context CT. For the MMD2-type module, this will forbid replacement of the start time ha2 by the current time hax. This will have the consequence that for this module, the cell that gave rise to corrective action will be considered as never having existed. It can also be provided for that the counter(s) of the count management module(s) are no longer updated. Consequently, every excess cell is eliminated thus bringing the virtual circuit to an acceptable throughput. More generally, no updating at all of the processing context CT can be introduced. The cell that gave rise to corrective action is then considered as not having been received by the evaluation device.

The practical implementation of the throughput evaluation device according to the invention does not pose a technical problem to the extent where the various parts thereof, as described, carry out simple arithmetic and logic operations. As indicated in FIG. 1, the combination of blocks BREC, BACT, BT and BC can be implemented in the form of a single ASIC component, i.e. in integrated circuit form. Memory MCT containing the context, at the present state of the technology, would be a separate component. The modular design of processing block BT makes it easily adaptable to the various applications envisaged. The case of the application considered is only one example and other configurations are possible. Such separate configurations could all be obtained starting from the same integrated circuit by providing it with a sufficient number of modules of various types and configuration means (registers and configuration switches), which for example are accessible via link CMP making it possible to set up a whole variety of different module configurations.

We claim:

1. A method for evaluating the throughput of virtual circuits carrying cells and employing an asynchronous timedivision multiplexed transmission channel, said method comprising:
    assigning, for each virtual circuit, a memory location containing a set of data, referred to hereinafter as the context, defining conditions for evaluating the throughput of each virtual circuit,
    reading the context of a particular virtual circuit to which a particular cell belongs upon reception of said particular cell by an evaluation device for the purpose of evaluating the throughput of said particular virtual circuit,
    using a clock signal to supply a current time associated with said particular virtual circuit,
    measuring the throughput of said particular virtual circuit to obtain a throughput measurement, through the use of said current time and at least one starting time written into said context upon arrival of a preceding cell, and supplying at least one throughput measurement for the particular virtual circuit,
    said method being further characterized in that said context includes at least one throughput threshold and in that said method further comprises: comparing one of said throughput measurements with said at least one threshold, changing an overflow counter in a first direction if said threshold is reached or exceeded, changing said counter in another direction if said threshold is not reached, determining that said changing has brought the overflow counter to an extreme position of said first direction, and then supplying a signal indicating a throughput overflow.

2. A method according to claim 1, characterized in that plural throughput thresholds are provided together with a count value, with said plural thresholds being separated by at least one interval, and that said step of comparing said one throughput measurement comprises comparing said one throughput measurement with said plural thresholds in order to determine within which interval between thresholds said measurement lies, and wherein said method further comprises modifying said count value as a function of said determined interval, and determining the arrival at an extreme position in a first direction of this count value in order to then supply said signal.

3. A device for evaluating the throughput of virtual circuits employing an asynchronous time-division multiplexed transmission channel, said device comprising:
    a memory in which, for each virtual circuit, a memory location is assigned containing a set of data, referred to hereinafter as the context, defining conditions for evaluating the throughput of each virtual circuit,
    reading means for, upon reception of a particular cell, reading the context of a particular virtual circuit to which said particular cell belongs,
    a clock signal source for supplying a current time associated with said particular virtual circuit,
    throughput measuring means for obtaining a throughput measurement of said particular virtual circuit through the use of said current time and at least one starting time written into said context upon arrival of a preceding cell, and for providing at least one throughput measurement for said particular virtual circuit, said device being further characterized in that said context includes at least one throughput threshold and in that said device further comprises:
    means for comparing one of said throughput measurements with said threshold,
    means for changing an overflow counter in a first direction if said threshold is reached or exceeded, or in another direction if said threshold is not reached, and
    means for determining that said changing has brought the overflow counter to an extreme position of said first direction, and for then supplying a signal indicating a throughput overflow.

4. A device according to claim 3, characterized in that plural throughput thresholds are provided together with a count value, with said plural thresholds being separated by at least one interval, and in that said comparing means compares one of said throughput measurements with said plural thresholds in order to determine within which interval between thresholds said measurement lies, said device further comprising means for modifying said count value as a function of said determined interval, and means for determining the arrival at an extreme value in a first direction of this count value in order to then supply said signal indicating a throughput overflow.

* * * * *